US008406979B2

(12) United States Patent
Loeffler et al.

(10) Patent No.: US 8,406,979 B2
(45) Date of Patent: Mar. 26, 2013

(54) METHOD FOR OPERATING AN INTERNAL COMBUSTION ENGINE, COMPUTER PROGRAM AND CONTROL UNIT

(75) Inventors: Axel Loeffler, Backnang (DE); Wolfgang Fischer, Gerlingen (DE); Roland Karrelmeyer, Bietgheim-Bissengen (DE); Gerald Graf, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 1156 days.

(21) Appl. No.: 12/323,176

(22) Filed: Nov. 25, 2008

(65) Prior Publication Data

US 2009/0182484 A1 Jul. 16, 2009

(30) Foreign Application Priority Data

Jan. 15, 2008 (DE) ........................ 10 2008 004 365

(51) Int. Cl.
*G06F 19/00* (2011.01)
*G06G 7/70* (2006.01)

(52) U.S. Cl. ........ 701/102; 701/103; 701/105; 701/111; 123/406.22; 123/406.41; 123/435

(58) Field of Classification Search .................. 701/102, 701/103, 111, 114, 105; 123/406.22, 406.23, 123/406.41, 435, 479, 486
See application file for complete search history.

(56) References Cited

U.S. PATENT DOCUMENTS

| | | | | |
|---|---|---|---|---|
| 5,150,300 | A * | 9/1992 | Danno et al. | 701/101 |
| 6,354,264 | B1 * | 3/2002 | Iwakiri et al. | 123/305 |
| 6,779,511 | B2 * | 8/2004 | Tonetti et al. | 123/480 |
| 7,509,932 | B2 * | 3/2009 | Hara et al. | 123/90.15 |
| 2006/0020384 | A1 * | 1/2006 | Smith et al. | 701/54 |
| 2006/0102158 | A1 * | 5/2006 | Cairns et al. | 123/568.14 |
| 2007/0213919 | A1 * | 9/2007 | Magarida et al. | 701/102 |
| 2008/0105233 | A1 * | 5/2008 | Koeller et al. | 123/435 |
| 2008/0221780 | A1 * | 9/2008 | Ishikawa | 701/104 |
| 2009/0118879 | A1 * | 5/2009 | Heap et al. | 701/22 |

FOREIGN PATENT DOCUMENTS

JP WO2006038600 * 4/2006

* cited by examiner

*Primary Examiner* — Willis R Wolfe, Jr.
*Assistant Examiner* — Anthony L Bacon
(74) *Attorney, Agent, or Firm* — Kenyon & Kenyon LLP

(57) ABSTRACT

A method for operating an internal combustion engine, especially an internal combustion engine that is operable, at least in a part-load range, in an operating mode with auto-ignition, in which, at an abrupt change in load and/or at a changeover between an operating mode with auto-ignition and an operating mode without auto-ignition, a parameter of the combustion process correlating with the combustion noise is adapted stepwise over a plurality of combustion cycles from a first parameter value before the abrupt change in load or the changeover to a second parameter value after the abrupt change in load or the changeover, by influencing a combustion position of the combustion process.

25 Claims, 10 Drawing Sheets

Fig. 1
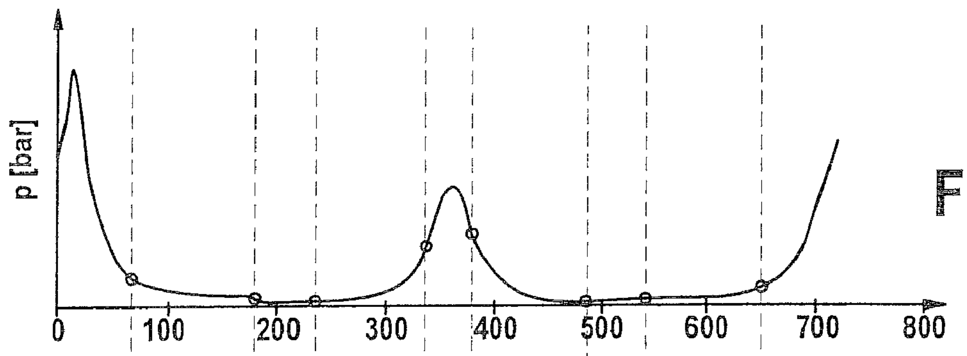
Fig. 1A
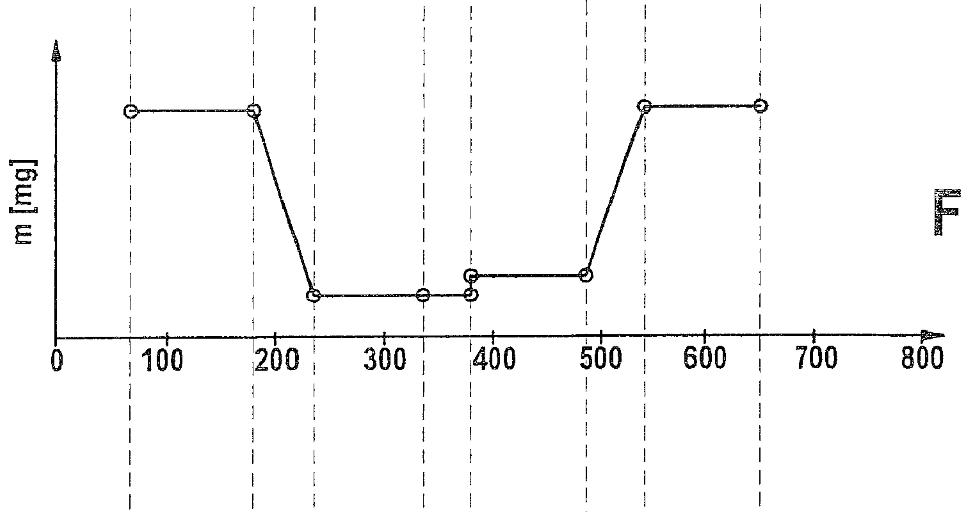
Fig. 1B
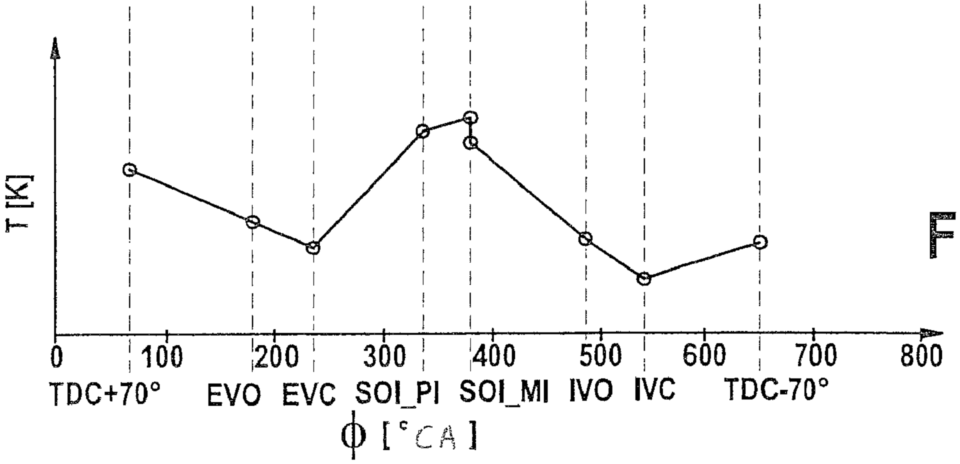
Fig. 1C (Fig. 8A)

METHOD FOR OPERATING AN INTERNAL COMBUSTION ENGINE, COMPUTER PROGRAM AND CONTROL UNIT

FIELD OF THE INVENTION

The present invention relates to a method for operating an internal combustion engine, especially an internal combustion engine that is operable, at least in a part-load range, in an operating mode with auto-ignition. The present invention further relates to a computer program and to a control unit for carrying out such a method.

BACKGROUND INFORMATION

A comparatively new development that has become known among gasoline engine combustion methods is the HCCI (Homogeneous Charge Compression Ignition) method, which is also referred to as the CAI (Controlled Auto Ignition) method. That method is distinguished by having a significant potential to save fuel compared with conventional spark-ignition operation.

CAI engines operate with a homogeneously (uniformly) distributed, lean ($\lambda>1$) mixture of fuel and air. Ignition is initiated in this case by the rising temperature as compression takes place and by any free radicals and intermediates or precursors of the preceding combustion process that have remained in the combustion chamber. Unlike the case of a conventional gasoline engine, this auto-ignition is completely desirable and forms the basis of the principle of why a spark plug is not needed in CAI operation. Outside a given part-load range, a spark plug is needed.

In CAI operation, the charge composition is ideally so uniform that combustion begins simultaneously throughout the combustion chamber. To produce stable CAI operation, internal or external exhaust gas recirculation or exhaust gas retention may be employed. By exhaust gas recirculation/retention it is to a certain extent possible to monitor the combustion position.

CAI combustion produces a comparatively low combustion temperature with very homogeneous mixture formation, which leads to a large number of exothermic centers in the combustion chamber and therefore to a combustion process that proceeds very evenly and rapidly. Pollutants such as NOx and soot particles may accordingly be avoided almost completely in comparison with stratified operation. It is therefore possible where appropriate to dispense with expensive exhaust gas treatment systems such as NOx storage catalysts. At the same time, efficiency is increased in comparison with spark-ignited combustion.

CAI engines are as a rule equipped with direct gasoline injection and a variable valve train, a distinction being made between fully variable and partially variable valve trains. An example of a fully variable valve train is EHVC (electro-hydraulic valve control) and an example of a partially variable valve train is a camshaft-controlled valve train with 2-point lift and phase adjuster.

In CAI engines, regulation of dynamic engine operation is a great challenge. The expression "dynamic engine operation" is used herein to mean on the one hand changing of the type of operation between the auto-ignition operating mode (CAI mode) and the spark-ignition operating mode (SI mode), and on the other hand also load changes within the CAI mode. Changes to the operating point in dynamic engine operation should take place as steadily as possible in respect of torque and noise, which, however, proves difficult on account of the factors described hereinafter:

In CAI operation, there is no direct trigger in the form of spark-ignition to initiate combustion. Accordingly, the combustion position has to be ensured by very carefully coordinated control of the injection and air system at every cycle of a dynamic changeover.

A further difficulty arises on changing between SI operation and CAI operation: in SI operation, the residual gas compatibility is comparatively low and therefore as little residual gas as possible should be retained in the cylinder. In contrast, however, CAI operation requires precisely a comparatively large proportion of residual gas. It is therefore not possible for the proportion of residual gas to be gradually raised "in preparation", as it were, before a change from SI operation to CAI operation, and conversely, when changing from CAI operation to SI operation, the proportion of residual gas may not already be lowered in advance since this would lead to considerable disturbance of the combustion behavior to the point of misfiring.

The effect described above also means that, at a changeover from SI operation to CAI operation under the control of a conventional linear controller, too much residual gas and/or residual gas that is too hot is generally retained for the first CAI cycles. Accordingly, combustion that is too early, that is, too loud to the point of knocking, and potentially damaging to the engine is obtained. That in turn means that the change in type of operation entails troublesome noise development.

Similar phenomena also occur at load changes within CAI operation. At an abrupt change from a lower to a higher load point, too little residual gas and/or residual gas that is too cold is retained in the first cycle following the load change, which leads to combustion that is too late (compared with the desired value) to the point of misfiring. In the reverse case of an abrupt change from a higher to a lower load value, combustion occurs by contrast too early and too loudly.

Consequently, both an abrupt change in load and a changeover between CAI operation and SI operation at the same load brings with it the problem of a rapid change in the combustion noise, which the driver generally finds disturbing.

There is therefore a need for an improved method for operating internal combustion engines, especially internal combustion engines that are operable, at least in a part-load range, in an operating mode with auto-ignition, which method involves a less disturbing variation of the combustion noise.

SUMMARY OF THE INVENTION

There is accordingly provided a method for operating an internal combustion engine, especially an internal combustion engine that is operable, at least in a part-load range, in an operating mode with auto-ignition, wherein, at an abrupt change in load and/or at a changeover between an operating mode with auto-ignition and an operating mode without auto-ignition, a parameter of the combustion process correlating with the combustion noise is adapted step-wise over a plurality of combustion cycles from a first parameter value before the abrupt change in load or the changeover to a second parameter value after the abrupt change in load or the changeover, by influencing a combustion position of the combustion process.

The present invention is based on the concept of making the noise profile more constant by influencing the combustion position. Accordingly, it is possible to avoid an abrupt transition in the combustion noise from one operating state (operation without auto-ignition or first load) to a subsequent load state (operation with auto-ignition or second load) and achieve a "smoother" transition. The expression "stepwise adaptation" is to be understood herein as meaning in particular that there is no abrupt jump (from one combustion cycle to the next) from the first parameter value to the second parameter value, but that the parameter assumes a plurality of intermediate values between the first and the second parameter. "Abrupt change in load" means a change in load within the CAI operating range, which essentially takes place from one combustion cycle to the next. Influencing of the combustion position may be effected by closed-loop control or by open-loop control. As a result of the combustion noise profile being made more constant or being smoothed, a combustion noise profile that is more pleasant for the driver is achieved.

The mentioned parameter may be especially a maximum pressure gradient in a combustion chamber of the internal combustion engine. The maximum pressure gradient correlates to a great extent with combustion noise, and therefore making the maximum pressure gradient more constant also leads to the combustion noise being made more constant.

The combustion position corresponds to a crankshaft angle at which a specific quantity, for example 50%, of the combustion energy of a combustion cycle has been converted in a combustion chamber of the internal combustion engine. By influencing the combustion position it is also possible to influence the maximum pressure gradient.

The parameter value may be adapted over at least three, preferably at least five, and especially over at least ten, combustion cycles. It is correspondingly possible, therefore, for many intermediate values of the parameter to be provided. The more intermediate values are provided, the smoother or "less noticeable" is the noise variation. The transition from the first parameter value to the second parameter value during the adaptation may correspond to a ramped transition. In that case, the variation of the parameter with time corresponds to a straight line. The transition from the first parameter value to the second parameter value during the adaptation may, however, also correspond to a low-pass-filtered abrupt change. In that case, there is a more gradual progression at the beginning and end of the adaptation process.

If the combustion process is regulated in the operating mode with auto-ignition by closed-loop control in which the combustion position is used as the reference variable, the stepwise adaptation of the parameter may be performed by modification of that reference variable. In that case, the regulation in the operating mode with auto-ignition may be model-based predictive closed-loop control, and the desired value of the combustion position may be adapted in preparation before changing over from the operating mode with auto-ignition to the operating mode without auto-ignition. In addition, the desired value of the combustion position may be adapted subsequently after the changeover from the operating mode without auto-ignition to the operating mode with auto-ignition. In that manner, it is possible to make the combustion noise more constant at changeovers between CAI operation and SI operation.

If the fuel is injected by direct injection into a combustion chamber of the internal combustion engine, it is also possible for the quantity of fuel injected to be shifted during the adaptation stepwise from a main injection to a cooling injection. The cooling injection may take place during the compression phase in the combustion process. Such a shifting of the injected quantity of fuel is a further possibility for influencing the combustion position. Shifting of the injected quantity of fuel is possible by a control or pilot control procedure, and therefore it requires no further combustion chamber information.

There is further provided a computer program having program code means, wherein the program code means are configured to carry out the above-described method when the computer program is executed with a program-controlled device.

In addition, a computer program product having program code means is provided, which program code means are stored on a computer-readable data medium in order to carry out the above-described method when the program product is executed on a program-controlled device.

A control unit according to the present invention for an internal combustion engine is programmed for use in the above-described method.

BRIEF DESCRIPTION OF THE DRAWINGS

FIG. 1A shows a plot of the cylinder pressure p as a function of the crankshaft angle, illustrating the modeling of the predicted 50% mass fraction burnt on the basis of physical process parameters.

FIG. 1B shows a plot of the gas mass m in the combustion chamber as a function of the crankshaft angle, illustrating the modeling of the predicted 50% mass fraction burnt on the basis of physical process parameters.

FIG. 1C shows a plot of the gas temperature T in the combustion chamber as a function of the crankshaft angle, illustrating the modeling of the predicted 50% mass fraction burnt on the basis of physical process parameters.

DETAILED DESCRIPTION

Figure 2:
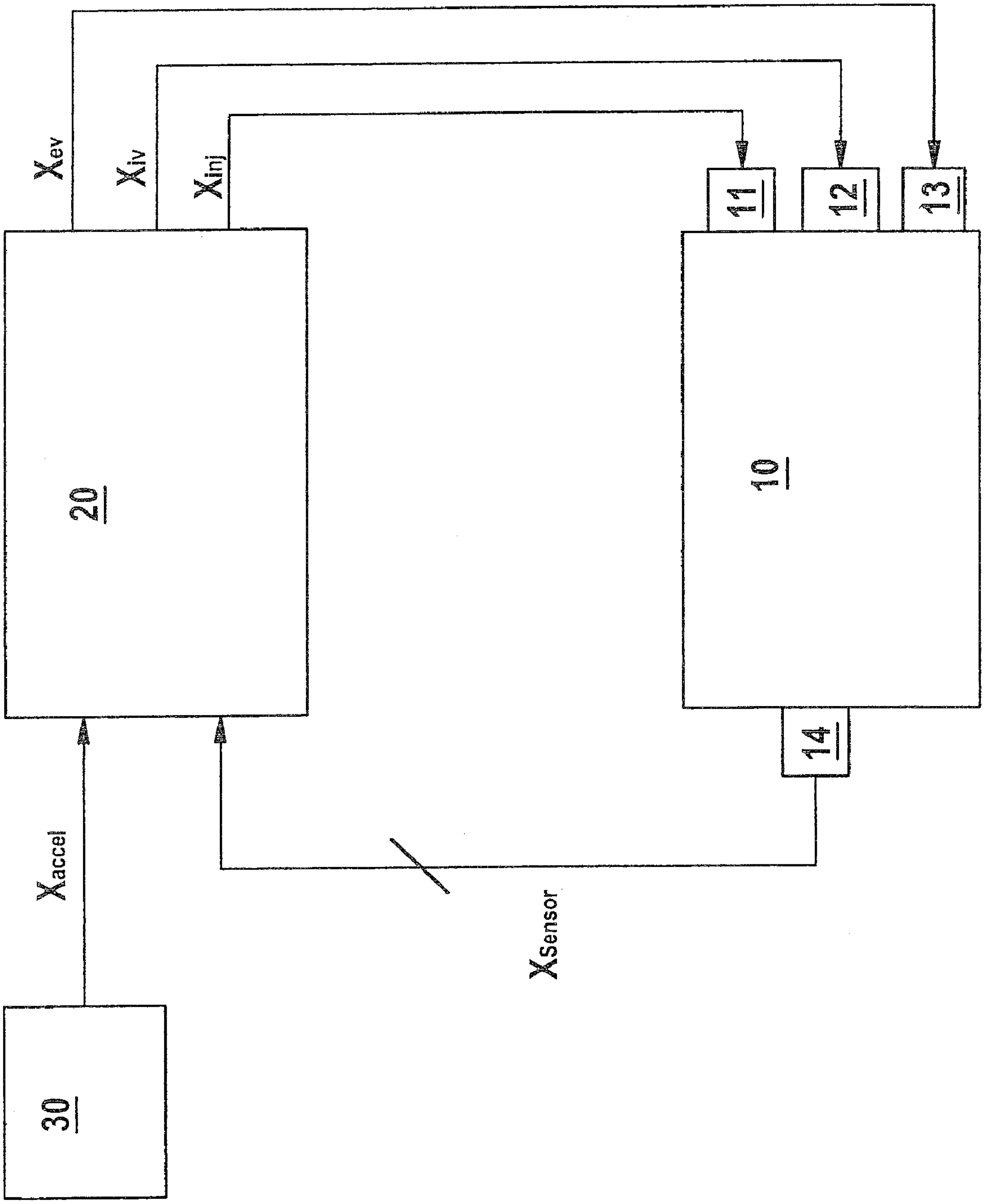
FIG. 2 shows schematically an internal combustion engine and a control unit for regulating the internal combustion engine.

Exemplary embodiments of a method and control unit according to the present invention will be explained hereinafter with reference to the accompanying drawings. Unless stated otherwise, identical or functionally identical elements have been provided with the same reference numerals in all the Figures.

The present invention will be explained hereinafter with reference to a gasoline engine that is operable selectively or in dependence on operating point in CAI operation and in SI operation. It is, however, generally applicable to engines that are operable at least in a part-load range in an operating mode with auto-ignition, that is to say, for example, is also applicable to diesel engines.

In accordance with a first exemplary embodiment, for regulation of the combustion process, first the desired value of a feature of the combustion process is determined and is then fed as a reference variable to a predictive closed-loop control system. At the output side, a manipulated value or a correction intervention in a manipulated value is determined with which the controlled system, that is, the combustion process, may be influenced.

All adjustable variables with which the combustion process may be influenced may be considered as manipulated variables. Suitable manipulated values are, for example, variables indicative of the course of the injection process, such as, for example, the start of the main injection (SOI_MI), the start of the pilot injection (SOI_PI), the apportionment of fuel between pilot injection and main injection (q_PI/q_MI), or also variables that determine the air supply, such as, for example, crankshaft angle on opening of the exhaust valve (EVO) or closing of the exhaust valve (EVC) or crankshaft angle on opening or closing of the intake valve (IVO or IVC). In the case of a fully variable valve train, the latter manipulated variables with regard to the air supply may be set individually for each cylinder and independently of one another. In the case of a partially variable valve train, they may where applicable be in a predetermined relationship to one another and, as a rule, may not be set cylinder-individually but rather may be set only globally. Hereinafter, manipulated variables relating to the air supply (that is, EVO, EVC, IVO, IVC or also ratios of those variables to one another) are collectively referred to as manipulated variable "EV". Among those parameters, EVO and EVC, in particular, allow intervention in the residual gas mass retained, with EVC offering the most effective action. It is generally assumed that it is possible for the relevant intervention to be achieved from cycle to cycle. Should an EVC intervention not be possible from cycle to cycle, for example when a partially variable, camshaft-controlled valve train is being used, recourse may be had to the control parameters from the injection system since that at any rate may be achieved cylinder-individually and from cycle to cycle.

A suitable reference variable of the closed-loop control is especially the 50% mass fraction burnt (MFB50), which gives the crankshaft angle at which 50% of the combustion energy of a combustion cycle has been converted. Further possible reference variables are the mean indicated torque, the indicated mean pressure (pmi) or the maximum pressure gradient in the cylinder (dp_max). It has been found, however, that in CAI engines the combustion position (at constant load, e.g. measured in pmi) is closely linked to noise development, it generally being the case that early combustion leads to high noise emissions. Furthermore, serious drops in the indicated torque do not occur unless combustion takes place too late or fails to occur. Consequently, in the examples which follow, the 50% mass fraction burnt MFB50 is used as the reference variable. It will be appreciated that as an alternative it is also possible to use as the reference variable information on the crankshaft angle at which a specific percentage (for example 30% or 70%) of the combustion energy has been converted.

A physical model on which model-based predictive closed-loop control of the combustion process may be based is described by way of example below.

A physical model of the combustion process uses physical principles for modeling. In this instance, for reasons of practicability, certain assumptions and simplifications are made, such as that pressure and temperature are approximately constant in spatial terms over the entire cylinder volume. Such a model is therefore also referred to as a "gray box model".

In the example under consideration, the variation of various physical process parameters will be calculated on the basis of a physical model of the combustion process in order to predict from those parameters the 50% mass fraction burnt MFB50 in the next combustion cycle. FIGS. 1A to 1C illustrate the modeling of the predicted 50% mass fraction burnt MFB50 on the basis of those physical process parameters. FIG. 1A shows the plot of the cylinder pressure p as a function of the crankshaft angle Ø. FIG. 1B shows the plot of the gas mass m in the combustion chamber as a function of the crankshaft angle Ø. FIG. 1C shows the plot of the gas temperature T in the combustion chamber as a function of the crankshaft angle Ø. The x-axis in FIGS. 1A to 1C shows the crankshaft angle Ø. In addition, certain events are marked by vertical dashed lines, namely opening and closing of intake and exhaust valve (i.e. EVO, EVC, IVO and IVC) and start of pilot injection and start of main injection (SOI-PI and SOI-MI).

In the example under consideration, on conclusion of a combustion process at a predefined first crankshaft angle (e.g. 70° after TDC) certain physical parameters of the combustion are measured, for example the cylinder pressure p which may be determined using a pressure gauge. Process parameters, such as, for example, m(TDC+70°) and T(TDC+70°), that are not directly accessible to measurement, such as, for example, the gas temperature T or the gas mass m, are derived from the measurable physical parameters, where applicable in combination with other stored or previously determined parameters. On the basis of those initial values p(TDC+70°), m(TDC+70°) and T(TDC+70°) the variation of the individual parameters is calculated, as illustrated in FIGS. 1A to 1C. In that calculation, physical principles are taken into consideration, these being especially the ideal gas law, the law of conservation of energy and the law of continuity, that is, especially the law of conservation of mass. In addition, the planned control interventions (EVO, EVC, etc.) are taken into consideration. This may be seen, for example, by the falling of the gas mass m between EVO and EVC in FIG. 1B. The variation of the process parameters p, m and T is modeled or predicted up to a predefined second crankshaft angle (e.g. 70° before TDC). From the values p(TDC−70°), m(TDC−70°) and T(TDC−70°) so calculated, it is then possible, for example using a previously determined and stored map, to determine the combustion position MFB50 for the next cycle k+1.

The physical model may be used by model inversion for predictive closed-loop control. In that case, a correction value (e.g. ΔEV) is calculated on the basis of an inverted system model, that is, on the basis of an inversion of the physical model explained above. The correction value ΔEV or the manipulated variable EV may be determined, for example, iteratively. For this, first the model described above is calculated for a predefined manipulated value EV and the predicted 50% mass fraction burnt MFB50 is determined. As the next step, the manipulated value EV is varied and the resulting predicted 50% mass fraction burnt MFB50 is determined. It is then possible for the optimum manipulated value EV to be determined by specifically varying the manipulated value EV on the basis of the manipulated-value-dependent predicted 50% mass fraction burnt MFB50 until the predicted 50% mass fraction burnt MFB50 has only a minimal deviation from the desired 50% mass fraction burnt MFB50_desired. Known mathematical methods for iterative optimization may be used for this. Accordingly, a correction value ΔEV (or a manipulated value EV) is determined which, when applied to the next combustion process, leads to the predicted 50% mass fraction burnt MFB50.

FIG. 2 shows schematically an internal combustion engine 10 and a control unit 20 for regulation thereof. Internal combustion engine 10 is operable in CAI operation at least over a part-load range. Internal combustion engine 10 has a plurality of final control elements 11, 12, 13, namely, for example, an injection actuator 11 with which fuel may be injected into a combustion chamber of the engine, and an intake valve 12 and an exhaust valve 13 with which the supply of air to the combustion chamber may be regulated. Using final control elements 11, 12, 13 it is possible to control the combustion process in the combustion chamber. Final control elements 11, 12, 13 are acted upon by actuation signals Xinj, Xiv and Xev, respectively. For example, exhaust valve 13 is opened when the control signal Xev assumes a predetermined first value and is closed when the actuation signal Xev assumes a predetermined second value.

Engine 10 further has a plurality of sensors 14 (only one sensor is shown here by way of example), which supply various sensor signals Xsensor, for example crankshaft angle, cylinder pressure, lambda signal, fresh air mass and temperature, to engine control unit 20. A sensor 30 is also provided, which determines a driver command (e.g. pressing down of the accelerator pedal) and supplies it as a driver command signal or load signal Xaccel to control unit 20.

From the sensor values Xsensor supplied and from the driver command signal Xaccel, control unit 20 determines manipulated variables EV and SOI on the basis of the predictive closed-loop control described hereinafter and finally converts those manipulated variables into the actuation signals Xinj, Xev and Xiv applied to final control elements 11, 12 and 13.

It should be noted that the engine may, in particular, be in the form of a multi-cylinder engine, in which case at least one or all of final control elements 11, 12, 13 are provided for each cylinder individually. In addition, for simplicity, actuation signals Xinj, Xic and Xev are illustrated as being calculated by control unit 20. It is equally possible, however, for a final stage (not shown) that is separate from control unit 20 to be provided, to which control unit 20 supplies the manipulated variables and which produces the actuation signals Xinj, Xiv and Xev on the basis of those manipulated variables.

Figure 3:
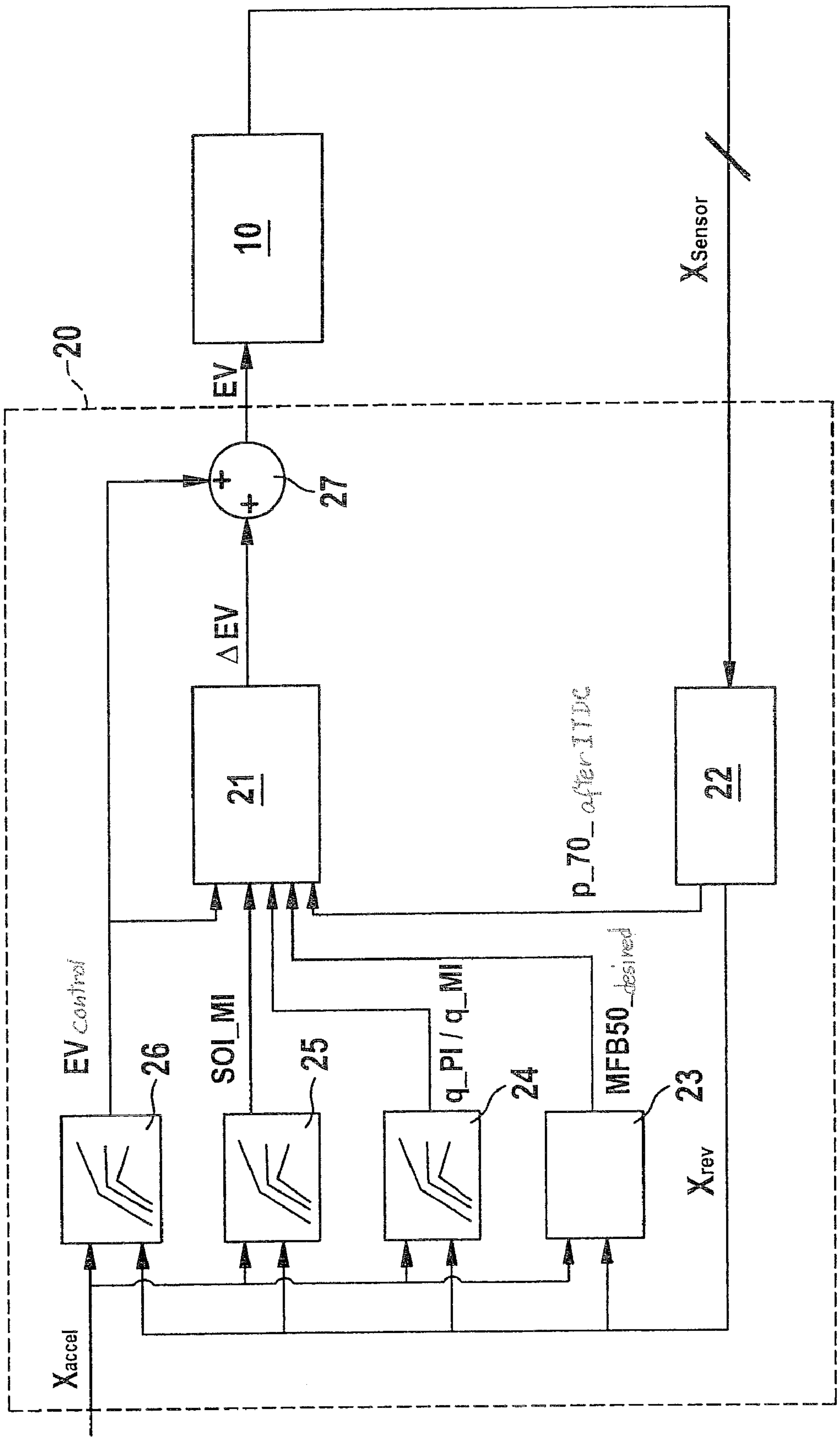
FIG. 3 shows a block diagram representing an example implementation of predictive closed-loop control in the engine control unit.

FIG. 3 is a block diagram showing an example of implementation of predictive closed-loop control in engine control unit 20. Engine control unit 20 has a memory and a program-controlled device (e.g. a microcomputer) which executes programs stored in the memory. The individual blocks in engine control unit 20 in FIG. 3 are explained in the form of structural elements, but may also be programs, parts of programs or program steps executed by the program-controlled device. The arrows represent the information flow and signals.

Control unit 20 has a control device or controller 21, a feature calculation device 22, a desired value determination device 23, maps 24 to 26, and an adder 27. In the example under consideration, control device 21 determines a correction value ΔEV with which a control value EV_control for the exhaust gas retained/recirculated and the air supply is corrected.

The parameters required to calculate ΔEV are determined as follows: feature calculation device 22 is supplied with the sensor signals Xsensor which, as mentioned above, contain information on the crankshaft angle, the cylinder pressure and other measured values. From those measured values feature calculation device 22 determines process parameters that are not directly measurable, for example the (instantaneous mean) engine speed Xrev, which is determined from the crankshaft angle, and outputs the engine speed Xrev to desired value determination device 23 and to maps 24 to 26. Feature calculation device 22 also outputs to control device 21 the measured cylinder pressure at 70 degrees crankshaft angle after ITDC (p__70_after ITDC).

Desired value determination device 23 determines the desired value MFB50_desired of the 50% mass fraction burnt, as explained in detail hereinafter. Maps 24 to 26 are supplied with a load signal Xaccel determined from the driver command and with the engine speed Xrev. Using map 24, the manipulated value q_PI/q_MI is determined, which gives the ratio of the quantity of fuel injected in the pilot injection to the quantity in the main injection. Using map 25, the manipulated variable SOI_MI is determined. Using map 26, the control value EV_control is determined. The values MFB_desired, q_PI/q_MI, SOI_MI and EV_control are fed to controller 21. The value EV_control is also fed to adder 27.

It should be noted that it is also possible for further manipulated values, such as, for example, the start of the pilot injection SOI_PI, the quantity of fuel in the main injection, or further manipulated values relating to the air supply to be determined using maps and fed to controller 21, but the example under consideration here is confined for simplicity to feeding of the manipulated values EV_control, SOI_MI and q_PI/q_MI.

Control device 21 accordingly has available to it all the values for the modeling procedure illustrated in FIGS. 1A to 1C and hence for the above-described iterative calculation of the correction value ΔEV. The correction value ΔEV calculated by control device 21 is added by adder 27 to the control value EV_control and the resulting value EV is converted into a corresponding actuation signal which is applied to final control element 13.

One advantage obtained with the regulation described above is that the predictive closed-loop control acts from cycle to cycle and thus renders possible rapid and accurate regulation for dynamic operation, that is, at abrupt changes in load or at changeovers in type of operation.

Figure 4:
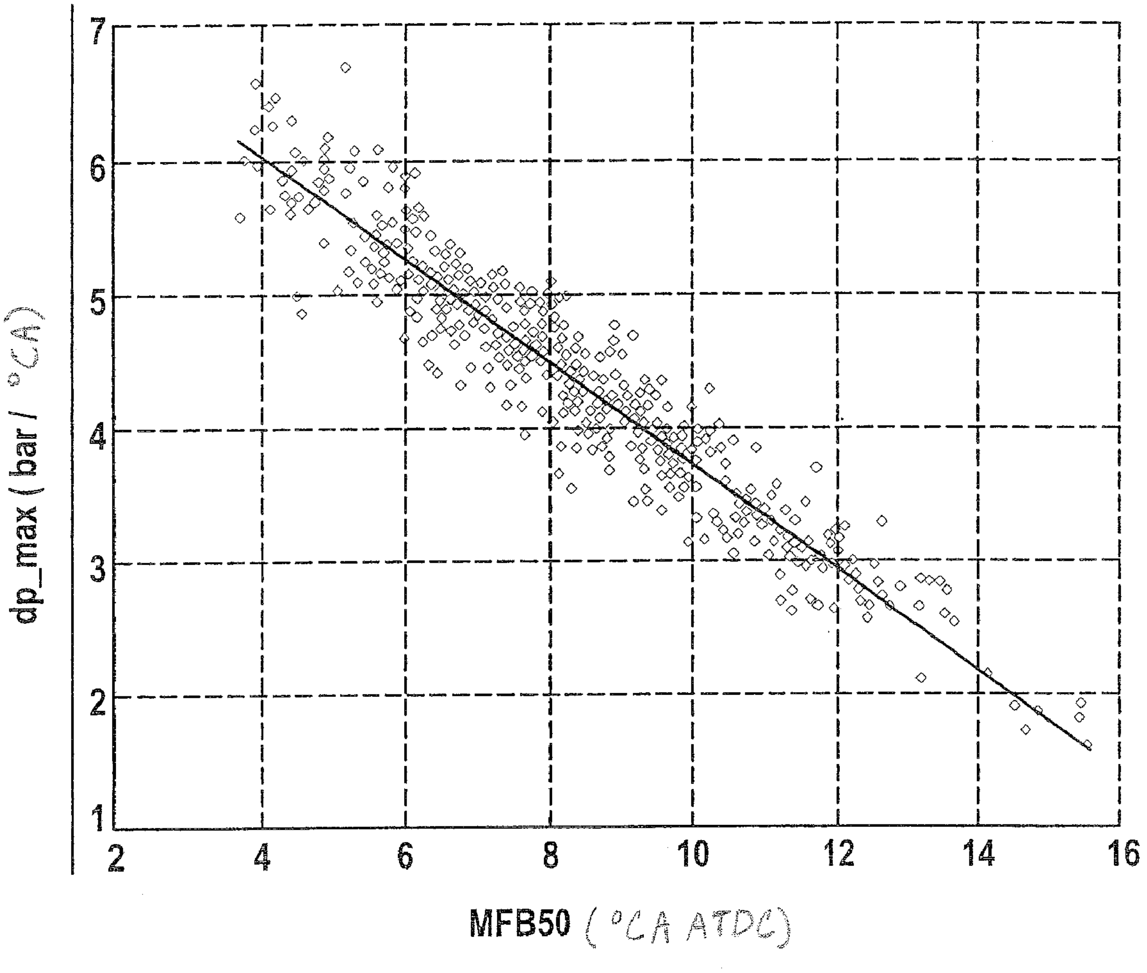
FIG. 4 illustrates the correlation between MFB50 and maximum pressure gradient dp_max at constant engine speed.

In CAI operation, the combustion position MFB50, the maximum pressure gradient dp_max in the combustion chamber and the applied load are closely interrelated. FIG. 4 illustrates this for the relationship between MFB50 and maximum pressure gradient dp_max at constant engine speed (approx. 2000 rpm). In FIG. 4, the continuous line shows a correlation of the measuring points illustrated. As will be apparent from FIG. 4, the maximum pressure gradient dp_max is the higher, the earlier is the 50% mass fraction burnt MFB50.

Figure 5:
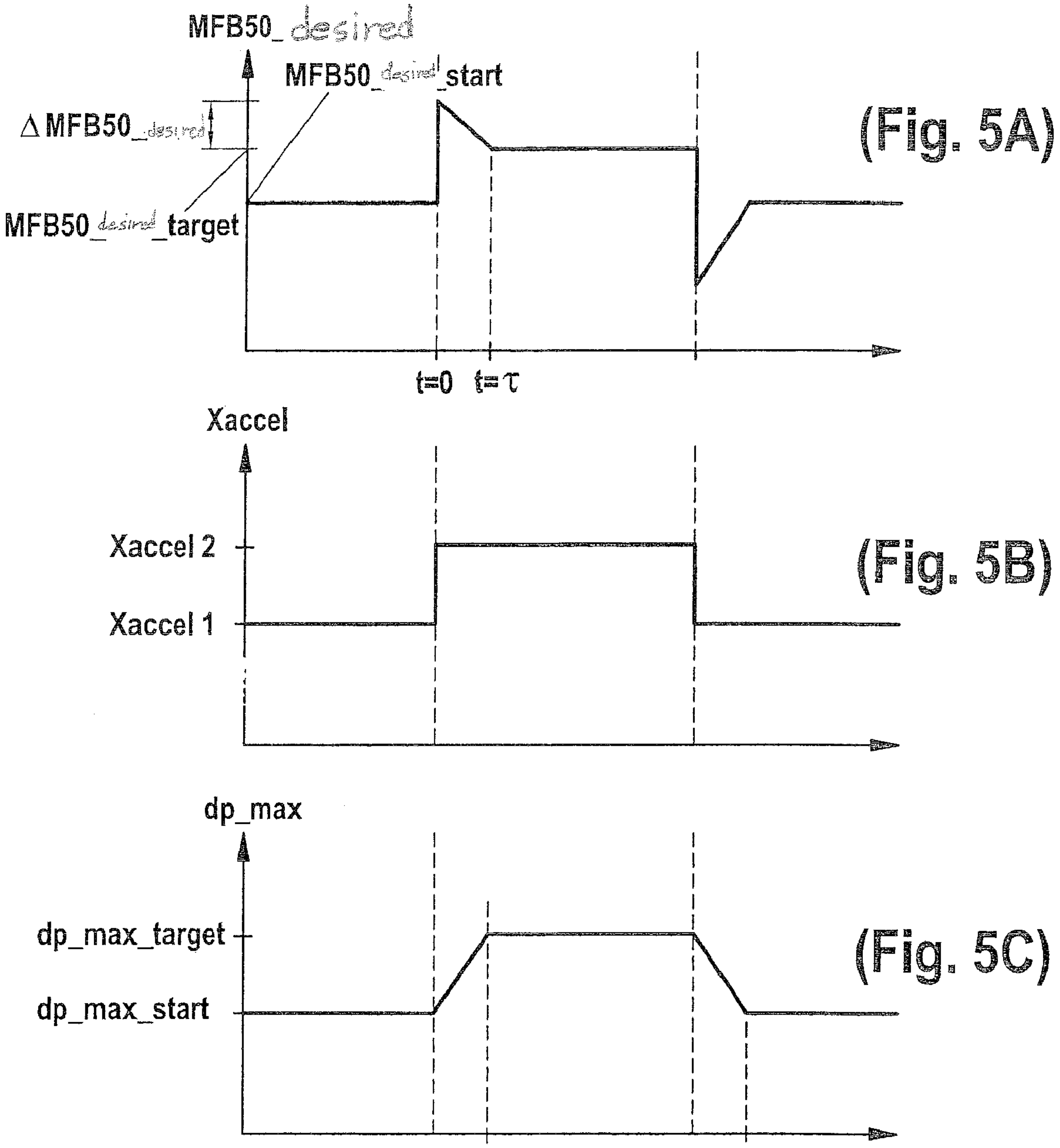
FIG. 5A shows an example plot of the desired value MFB50_desired of the 50% mass fraction burnt at an abrupt change in load to a higher load.
FIG. 5B shows an example plot of the load signal Xaccel at an abrupt change in load to a higher load.
FIG. 5C shows an example plot of the maximum pressure gradient dp_max at an abrupt change in load to a higher load.

FIGS. 5A to 5C show example plots of the desired value MFB50_desired of the 50% mass fraction burnt (FIG. 5A), the plot of the load signal Xaccel (FIG. 5B) and the plot of the maximum pressure gradient dp_max (FIG. 5C) at an abrupt change to a higher load, in accordance with the present exemplary embodiment. It should be noted that the combustion process in the engine is a cyclic process, with the mentioned values being discrete for each cycle. FIGS. 5A to 5C, on the other hand, show the mentioned values schematically as a continuous curve. For example, FIG. 5A shows a desired value trajectory which the desired value MFB50_desired follows. Furthermore, the actual maximum pressure gradient is subject to stochastic variations. FIG. 5C, on the other hand, shows a maximum pressure gradient dp_max that has been smoothed (for example by suitable filtering) or averaged. The same applies also to the following FIGS. 7A to 9B.

At a given initial load Xaccel1, there is a steady-state maximum pressure gradient dp_max_start and a 50% mass fraction burnt MFB50_desired_start. If an abrupt load change to a load Xaccel2 were then to take place, the maximum pressure gradient dp_max would also change abruptly to a corresponding value dp_max_target, which would involve a noise change that is unpleasant because it is very abrupt/discontinuous. To counteract this, a gentler transition between the pressure gradient dp_max_start and dp_max_target is implemented in accordance with the present invention.

In the exemplary embodiment under consideration, this is achieved by virtue of the fact that the desired value MFB50_desired of the 50% mass fraction burnt undergoes subsequent management in such a manner that the variation of the maximum pressure gradient dp_max is smoothed. At the moment of the load change (t=0), the desired value MFB50_desired is adjusted by a correction value (ΔMFB50_desired) such that, also after the load change, the maximum pressure gradient dp_max has substantially the same value (dp_max_start) as before the load change. Thereafter, over a period of duration τ, the desired value is steadily altered to the steady-state target value MFB50_desired_target (i.e. is lowered in the case of an increase in load). Consequently, the maximum pressure gradient dp_max also is gradually approximated to the steady-state dp_max_target. The variation of the maximum pressure gradient dp_max is thus smoothed, which results in noise development that is more pleasant for the driver. An analogous procedure is carried out as described also in the case of a reduction in load.

Adaptation of the maximum pressure gradient dp_max is therefore achieved here by management of the desired value of the 50% mass fraction burnt MFB50_desired using desired value determination device 23. The duration τ of the adaptation may, for example, be ten combustion cycles.

Figure 6:
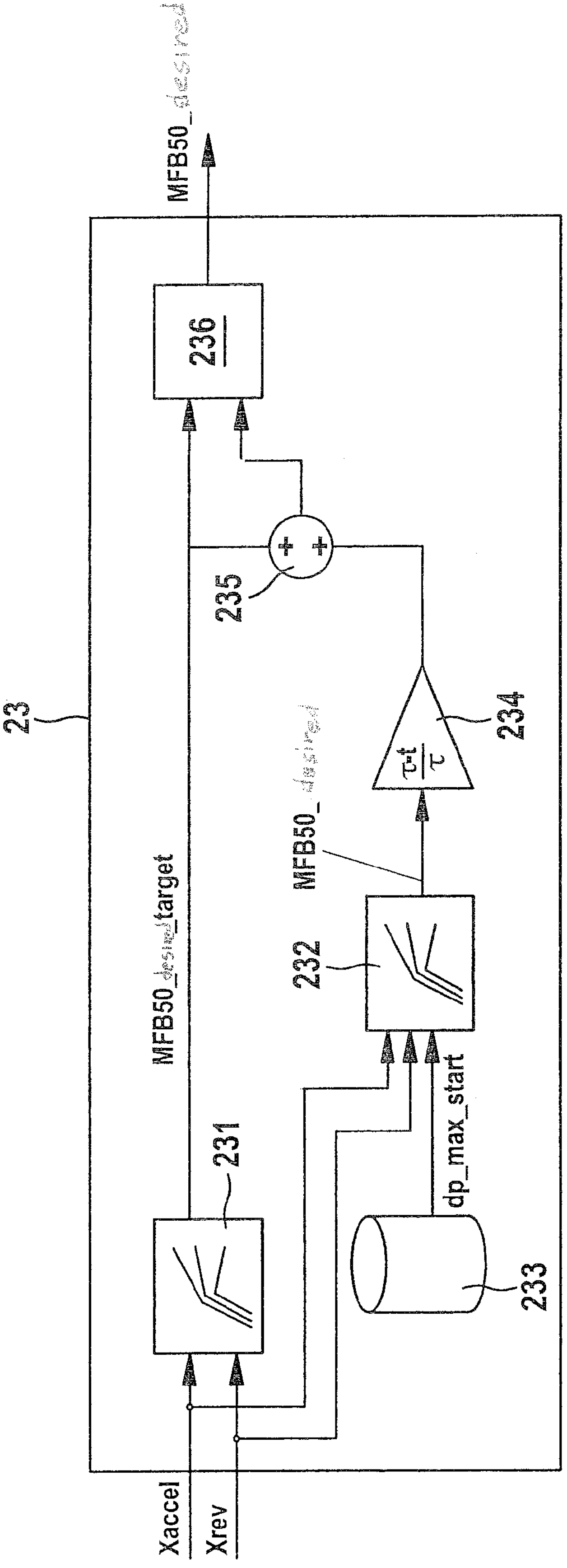
FIG. 6 shows an example configuration of a desired value determination device in accordance with one exemplary embodiment of the present invention.
Figure 7:
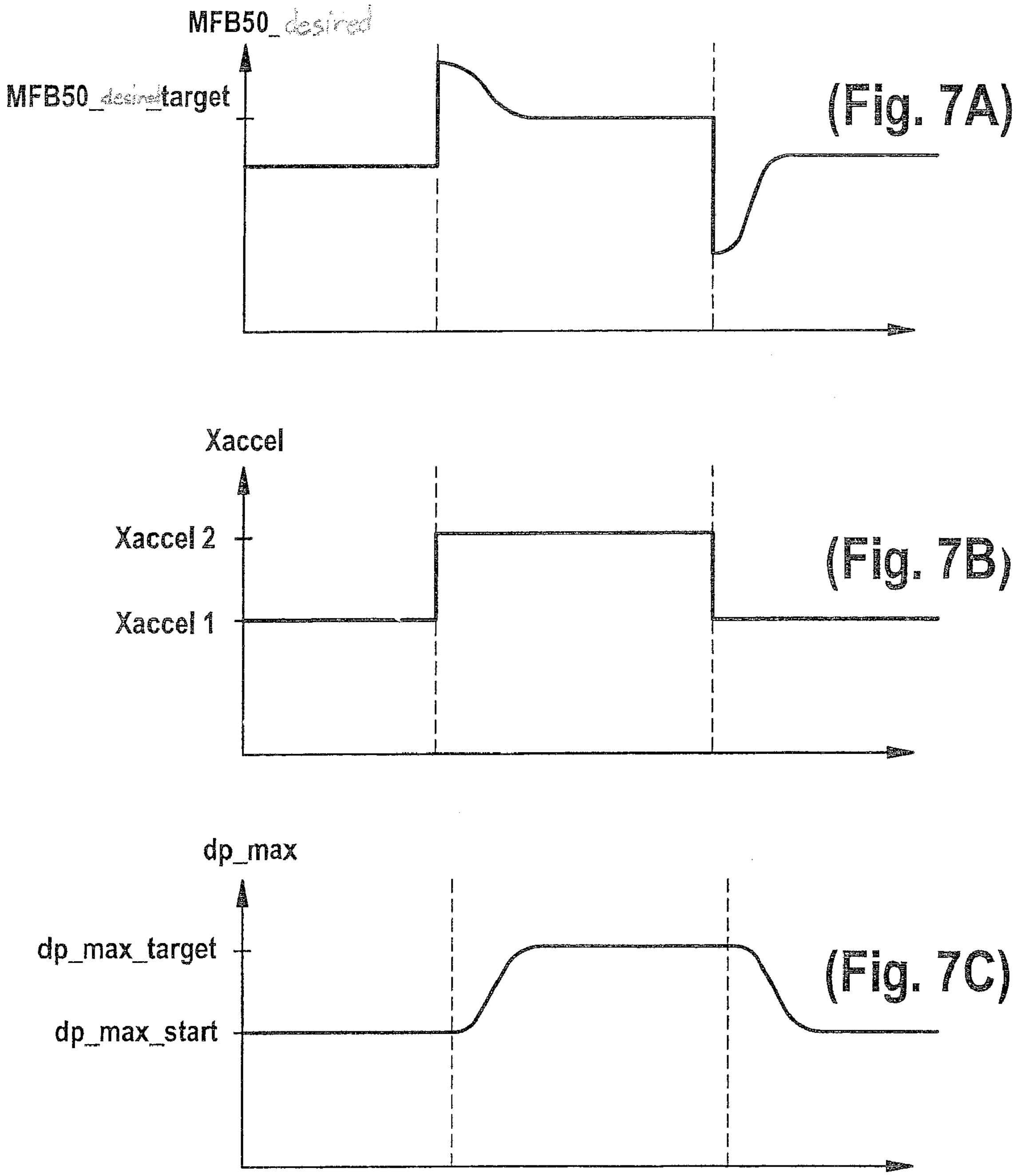
FIG. 7A shows an example plot of the desired value MFB50_desired of the 50% mass fraction burnt at an abrupt change in load to a higher load in an alternative exemplary embodiment with subsequent adaptation.
FIG. 7B shows an example plot of the load signal Xaccel at an abrupt change in load to a higher load in an alternative exemplary embodiment with subsequent adaptation.
FIG. 7C shows an example plot of the maximum pressure gradient dp_max at an abrupt change in load to a higher load in an alternative exemplary embodiment with subsequent adaptation.
Figure 8:
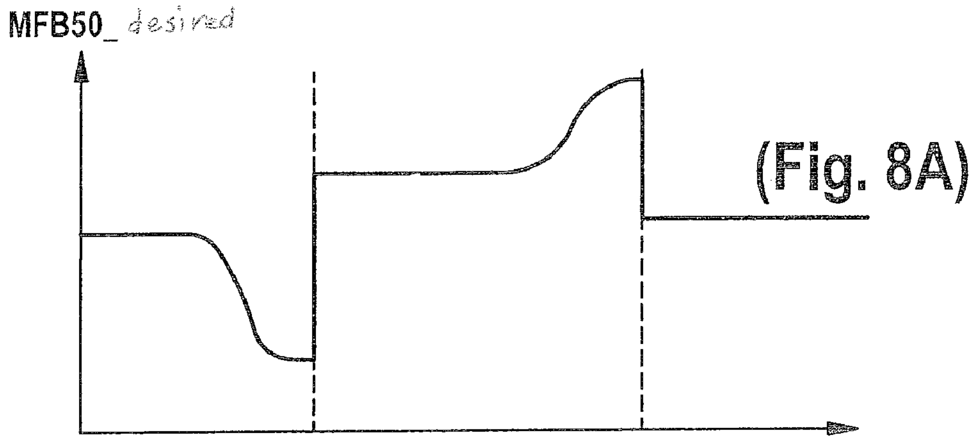
FIG. 8A shows an example plot of the desired value MFB50_desired of the 50% mass fraction burnt at an abrupt change in load to a higher load in an alternative exemplary embodiment with preparatory adaptation.
FIG. 8B shows an example plot of the load signal Xaccel at an abrupt change in load to a higher load in an alternative exemplary embodiment with preparatory adaptation.
FIG. 8C shows an example plot of the maximum pressure gradient dp_max at an abrupt change in load to a higher load in an alternative exemplary embodiment with preparatory adaptation.
Figure 8:
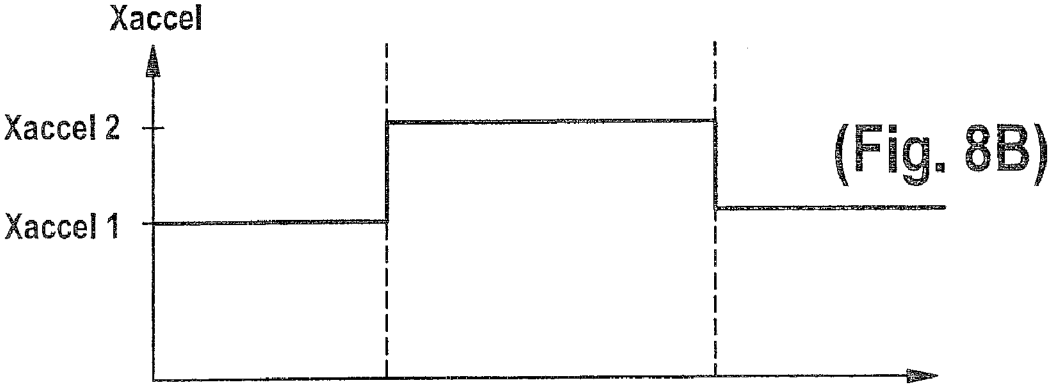
Figure 8:
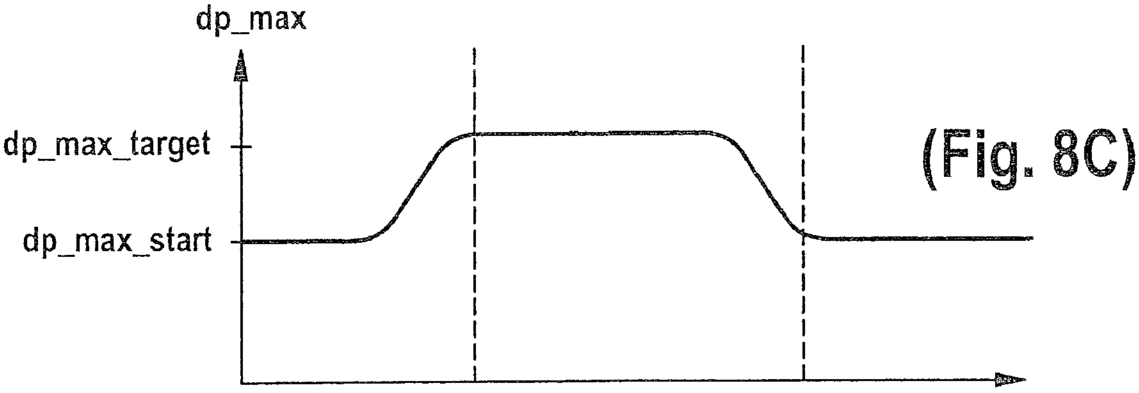
Figure 9:
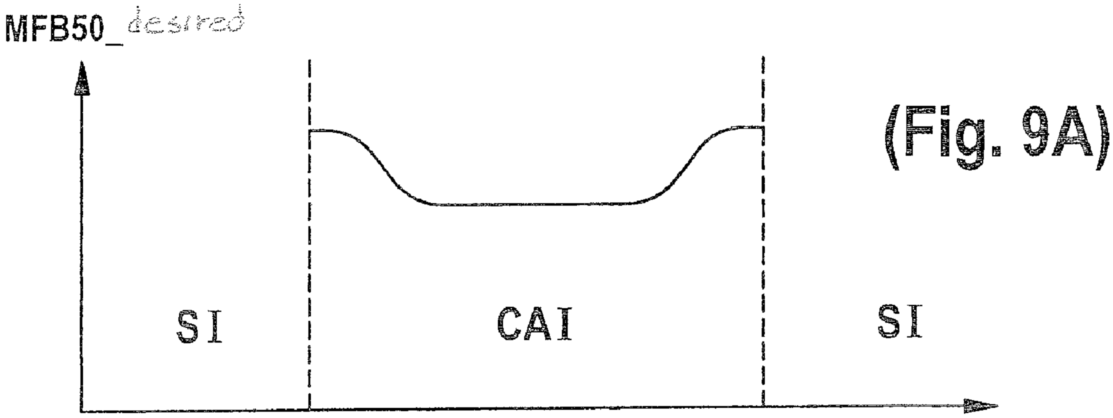
FIG. 9A illustrates a plot of the desired value MFB50_desired at changes in type of operation between SI operation and CAI operation.
FIG. 9B illustrates a plot of the maximum pressure gradient dp_max at changes in type of operation between SI operation and CAI operation.
Figure 9:
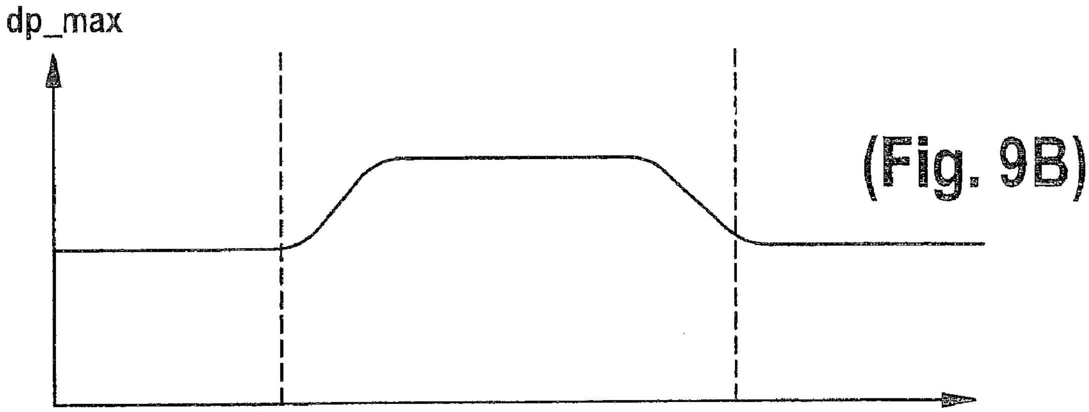

Desired value determination device 23 may, for example, be implemented as illustrated in FIG. 6. Desired value determination device 23 in FIG. 6 includes maps 231, 232, a memory 233, a multiplier 234, an adder 235 and a switch 235.

Map 231 determines from the current load value Xaccel and the engine speed Xrev a desired value MFB50_desired_target, which is output in the steady-state load state, and outputs that value to switch 236. Stored in memory 233 is the maximum pressure gradient dp_max_start before the load change. Map 232 determines from the current load value Xaccel and the maximum pressure gradient dp_max_start a correction value ΔMFB50_desired which is multiplied by multiplier 234 by the factor (τ−t)/τ, where t runs from 0 (time of abrupt change in load) to τ. Adder 235 adds the product ΔMFB50_desired*(τ−t)/τ (i.e. a gradually decreasing correction value) to the target value MFB50_desired_target. That sum is also fed to switch 236.

In the steady state, the switch outputs the value MFB50_desired_target. If, however, control unit 20 establishes that a load change is taking place, the switch is switched to the output of adder 235 for the period τ, so that the corrected value is output. Accordingly, the plot of MFB50_desired illustrated in FIG. 5A is obtained. The maximum pressure gradient is therefore adapted to a target value resulting from the load change in a ramp shape over the period τ. When the steady state is reached, switch 236 is switched to MFB50_desired_target again and the pressure gradient dp_max corresponding to that value MFB50_desired_target is stored in memory 233. As an alternative, it is also possible to monitor the actual maximum pressure gradient and constantly update the value stored in memory 233, where appropriate using smoothing.

Adaptation of the maximum pressure gradient does not have to proceed in a ramp shape but may, as illustrated in FIGS. 7A to 7C, also have the pattern of a low-pass-filtered signal. This may be done, for example, by using a PT1 element or PT2 element at a suitable location in desired value determination device 23.

Furthermore, adaptation of the maximum pressure gradient is not restricted to subsequent adaptation but may also be carried out as a preparatory measure. This is illustrated schematically in FIGS. 8A to 8C. A condition for preparatory adaptation is that the abrupt change in load is capable of being anticipated, that is to say, for example, that after detection of a corresponding driver command signal it is possible for the alteration of the load signal Xaccel to be held back for the period τ. As shown in FIGS. 8A to 8C, the desired value MFB50_desired is already altered before an abrupt change in load in such a way that the associated maximum pressure gradient dp_max is brought at the moment of the abrupt change in load to a level corresponding to the level of the pressure gradient dp_max after the abrupt change in load at a corresponding desired value MFB50_desired. With this exemplary embodiment also, therefore, a gradual change in engine noise, which is more pleasant for the driver, is possible.

Finally, it will readily be appreciated that a combination of preparatory and subsequent adaptation is also possible. This may be advantageous in cases where it is not possible for the abrupt change in load to be held back for the entire period τ. If, for example, τ corresponds to, say, ten cycles and the abrupt change in load may be held back for only three cycles, then the adaptation may take place as a preparatory adaptation over three cycles and as a subsequent adaptation over the seven remaining cycles.

Furthermore, adaptation is also possible at a changeover between an operating mode with auto-ignition (CAI mode) and an operating mode without auto-ignition (SI mode). FIGS. 9A and 9B show plots of the desired value MFB50_desired and of the maximum pressure gradient dp_max at changes in type of operation between SI operation and CAI operation. In this case, the change in type of operation takes place in a torque-neutral manner. There is no abrupt change in load, therefore, at changes in type of operation.

According to the exemplary embodiment under consideration, the combustion process in engine 10 is regulated by the model-based predictive closed-loop control described above only during CAI operation. Consequently, the desired value of the reference variable of the predictive closed-loop control, that is, MFB50_desired, is also provided only during CAI operation. In the first cycles following the switch to CAI operation, there is still too much residual gas and/or residual gas that is too hot in the cylinder. Without adaptation, combustion would therefore be too early and too loud. This is compensated for by the illustrated late shifting of the desired value MFB50_desired for the predictive closed-loop control. In other words, when control unit 20 switches from SI operation to CAI operation, the desired value MFB50_desired is corrected in a subsequent procedure in order to adapt the maximum pressure gradient dp_max stepwise to the value obtained after the operating mode change. This corresponds to the subsequent adaptation procedure in FIGS. 7A to 7C.

Adaptation of the maximum pressure gradient dp_max also takes place in a similar manner in the case of a change from CAI operation to SI operation. In this case, however, the desired value MFB50_desired is raised in preparation, that is, the combustion position is delayed in order in that manner to reduce the maximum pressure gradient dp_max to the level after the change in type of operation to SI operation. At the moment of the change in operation, the maximum pressure gradient dp_max will then have already reached the required level. Since the sound level of the engine noise substantially corresponds to the maximum pressure gradient dp_max, with this embodiment it is also possible to avoid an abrupt change in the combustion noise and obtain a gradual change in the combustion noise, which is more pleasant for the driver, at changes in type of operation between SI operation and CAI operation.

In the exemplary embodiments described above, the combustion position was influenced using control interventions with regard to the air supply (that is, for example, EVO, EVC) in order to achieve adaptation of the maximum pressure gradient dp_max. The combustion position may be influenced, however, not only using control interventions with regard to the air supply but also by other measures. For example, it is also possible to obtain a shift in the combustion position by re-distribution of the injected fuel from the main injection to a so-called cooling injection.

Figure 10:
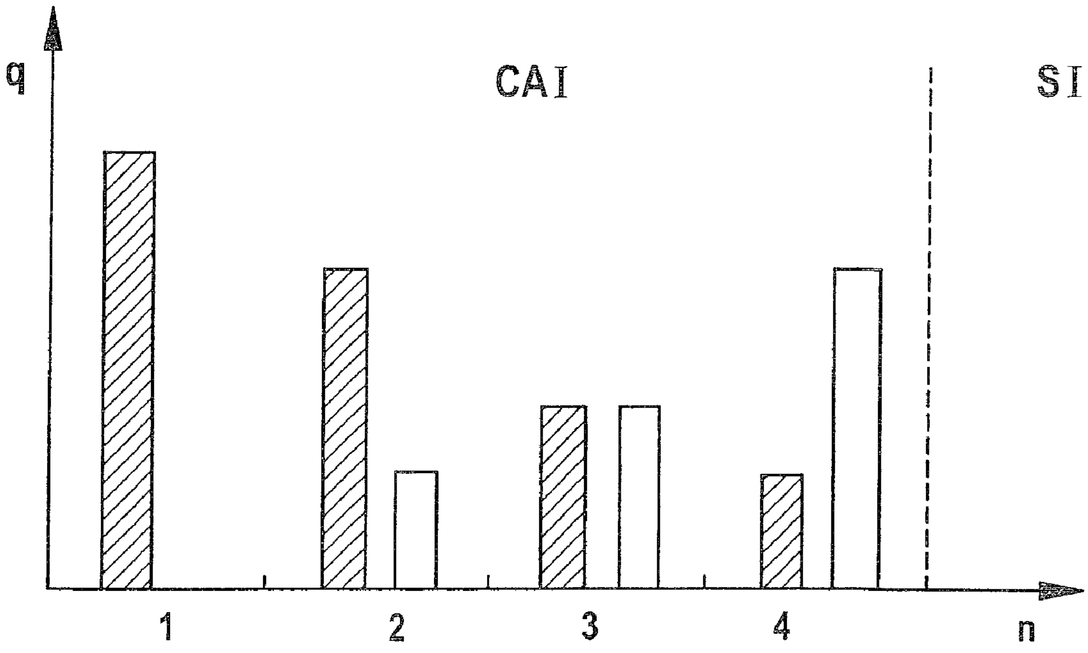
FIG. 10 shows schematically the re-distribution of the injection quantity q from main injection to cooling injection when a change in type of operation from CAI operation to SI operation is imminent, in accordance with a further exemplary embodiment.

FIG. 10 is a schematic illustration of the re-distribution of the injection quantity q from main to cooling injection when a change in type of operation from CAI operation to SI operation is imminent. The change in type of operation, which is indicated by a dashed line, takes place with the fourth cycle.

The dark bars schematically represent the injection quantity of the main injection and the pale bars schematically represent the injection quantity of the cooling injection. As illustrated in the Figure, in the last three cycles before the change in type of operation in cycle 5, the injection quantity is re-distributed stepwise from the main injection to the cooling injection.

The cooling injection typically takes place during the compression phase after closing of the intake valve. Since the temperature of the fuel is lower than the temperature of the gas in the cylinder, owing to the enthalpy of vaporization that cooling injection reduces the gas temperature in the cylinder. In the CAI method, the combustion position reacts very sensitively to gas temperature, and consequently a delayed start of combustion and on average a later combustion position MFB50 is obtained. As illustrated in FIG. 4, a later combustion position MFB50 is accompanied by a reduced maximum cylinder pressure gradient dp_max, that is, by a somewhat slower and less harsh combustion. Consequently, the combustion noise is successively reduced to the expected level after the switch to SI operation, and a noise profile that is more pleasant for the driver is obtained. The profile of combustion position MFB50 and maximum pressure gradient dp_max substantially corresponds in this case to the profile illustrated in FIGS. 9A and 9B for the changeover from CAI operation to SI operation. A shaping of the combustion noise profile is achieved, therefore, by pilot control intervention in the injection quantity. It will be appreciated that such a re-distribution to a cooling injection may also be applied analogously in the case of an abrupt change in load. In addition, the apportionment of the injection quantity may also take place linearly, as shown in FIG. 10, or by way of appropriate filtering.

The above-described preparatory shifting of the injected quantity of fuel to a cooling injection in accordance with this exemplary embodiment requires that the change in type of operation or the abrupt change in load is capable of being anticipated or of being delayed by a number of cycles. It should further be noted that the shifting of the injected quantity of fuel involves purely pilot control as distinct from the previously described correction of the desired value MFB50 of the combustion position which is a closed-loop control measure. This has the advantage that this exemplary embodiment does not require any combustion chamber information (cylinder pressure signal or the like) and may therefore also be applied to methods in which the engine is operated without the use of combustion chamber pressure sensors. To guard against any instability, however, it is advantageous to restrict the duration of the pilot control to a small number of cycles, for example three or five cycles.

Although the above form of implementation has been described hereinbefore with reference to preferred exemplary embodiments, it is not limited thereto, but may be modified in a variety of ways. In particular, various features of the configurations described above may be combined with one another.

For example, in the above exemplary embodiments, the reference variable MFB50 was determined on the basis of a physical model, but it is equally possible for it to be determined on the basis of a data-driven black box model.

What is claimed is:

1. A method for operating an internal combustion engine operable, at least in a part-load range, in an operating mode with auto-ignition, the method comprising:

adapting stepwise, at a changeover between the operating mode with auto-ignition and an operating mode without auto-ignition, a parameter of a combustion process correlating with a combustion noise over a plurality of combustion cycles, from a first parameter value before the changeover between operating modes to a second parameter value after the changeover between operating modes, by influencing a combustion position of the combustion process.

2. The method according to claim 1, wherein the parameter includes a maximum pressure gradient in a combustion chamber of the internal combustion engine.

3. The method according to claim 1, wherein the combustion position corresponds to a crankshaft angle at which a specific quantity of a combustion energy of a combustion cycle has been converted in a combustion chamber of the internal combustion engine.

4. The method according to claim 1, wherein the parameter value is adapted over at least three combustion cycles.

5. The method according to claim 1, wherein a transition during the adapting from the first parameter value to the second parameter value corresponds to a ramped transition.

6. The method according to claim 1, wherein a transition during the adapting from the first parameter value to the second parameter value corresponds to a low-pass-filtered abrupt change.

7. The method according to claim 1, wherein the parameter value is adapted over at least five combustion cycles.

8. The method according to claim 1, wherein the parameter value is adapted over at least ten combustion cycles.

9. A non-transitive computer-readable medium in which are stored instructions executable by a processor, the instructions which, when executed by the processor, cause the processor to perform a method for operating an internal combustion engine that is operable, at least in a part-load range, in an operating mode with auto-ignition, the method comprising:

adapting stepwise, at a changeover between the operating mode with auto-ignition and an operating mode without auto-ignition, a parameter of a combustion process correlating with a combustion noise over a plurality of combustion cycles, from a first parameter value before the changeover between operating modes to a second parameter value after the changeover between operating modes, by influencing a combustion position of the combustion process.

10. A control unit for operating an internal combustion engine operable, at least in a part-load range, in an operating mode with auto-ignition, the control unit comprising:

a computer processor configured to adapt stepwise, at a changeover between the operating mode with auto-ignition and an operating mode without auto-ignition, a parameter of a combustion process correlating with a combustion noise over a plurality of combustion cycles, from a first parameter value before the changeover between operating modes to a second parameter value after the changeover between operating modes, by influencing a combustion position of the combustion process.

11. A method for operating an internal combustion engine operable, at least in a part-load range, in an operating mode with auto-ignition, the method comprising:

adapting stepwise, at at least one of (a) an abrupt change in load and (b) a changeover between the operating mode with auto-ignition and an operating mode without auto-ignition, a parameter of a combustion process correlating with a combustion noise over a plurality of combustion cycles, from a first parameter value before at least one of (a) the abrupt change in load and (b) the changeover between operating modes to a second parameter value after at least one of (a) the abrupt change in load and (b) the changeover between operating modes, by influencing a combustion position of the combustion process;

wherein:

the combustion process is regulated in the operating mode with auto-ignition by closed-loop control;

the combustion position is used as a reference variable; and the stepwise adapting of the parameter includes modifying the reference variable.

12. The method according to claim 11, wherein the closed-loop control in the operating mode with auto-ignition includes a model-based predictive closed-loop control procedure, and a desired value of the combustion position is adapted in preparation before the changeover from the operating mode with auto-ignition to the operating mode without auto-ignition.

13. The method according to claim 11, wherein the closed-loop control in the operating mode with auto-ignition includes a model-based predictive closed-loop control procedure, and a desired value of the combustion position is adapted subsequently after the changeover from the operating mode without auto-ignition to the operating mode with auto-ignition.

14. A method for operating an internal combustion engine operable, at least in a part-load range, in an operating mode with auto-ignition, the method comprising:

adapting stepwise, at at least one of (a) an abrupt change in load and (b) a changeover between the operating mode with auto-ignition and an operating mode without auto-ignition, a parameter of a combustion process correlating with a combustion noise over a plurality of combustion cycles, from a first parameter value before at least one of (a) the abrupt change in load and (b) the changeover between operating modes to a second parameter value after at least one of (a) the abrupt change in load and (b) the changeover between operating modes, by influencing a combustion position of the combustion process;

injecting fuel by direct injection into a combustion chamber of the internal combustion engine; and shifting a quantity of fuel injected during the stepwise adapting from a main injection to a cooling injection.

15. The method according to claim 14, wherein the cooling injection takes place during a compression phase in the combustion process.

16. A non-transitive computer-readable medium in which are stored instructions executable by a processor, the instructions which, when executed by the processor, cause the processor to perform a method for operating an internal combustion engine that is operable, at least in a part-load range, in an operating mode with auto-ignition, the method comprising:

adapting stepwise, at at least one of (a) an abrupt change in load and (b) a changeover between the operating mode with auto-ignition and an operating mode without auto-ignition, a parameter of a combustion process correlating with a combustion noise over a plurality of combustion cycles, from a first parameter value before at least one of (a) the abrupt change in load and (b) the changeover between operating modes to a second parameter value after at least one of (a) the abrupt change in load and (b) the changeover between operating modes, by influencing a combustion position of the combustion process;

wherein:

the combustion process is regulated in the operating mode with auto-ignition by closed-loop control;

the combustion position is used as a reference variable; and the stepwise adapting of the parameter includes modifying the reference variable.

17. The non-transitive computer-readable medium according to claim 16, wherein the closed-loop control in the operating mode with auto-ignition includes a model-based predictive closed-loop control procedure, and a desired value of the combustion position is adapted in preparation before the changeover from the operating mode with auto-ignition to the operating mode without auto-ignition.

18. The non-transitive computer-readable medium according to claim 16, wherein the closed-loop control in the operating mode with auto-ignition includes a model-based predictive closed-loop control procedure, and a desired value of the combustion position is adapted subsequently after the changeover from the operating mode without auto-ignition to the operating mode with auto-ignition.

19. A control unit for operating an internal combustion engine operable, at least in a part-load range, in an operating mode with auto-ignition, the control unit comprising:

a computer processor configured to adapt stepwise, at at least one of (a) an abrupt change in load and (b) a changeover between the operating mode with auto-ignition and an operating mode without auto-ignition, a parameter of a combustion process correlating with a combustion noise over a plurality of combustion cycles, from a first parameter value before at least one of (a) the abrupt change in load and (b) the changeover between operating modes to a second parameter value after at least one of (a) the abrupt change in load and (b) the changeover between operating modes, by influencing a combustion position of the combustion process;

wherein:

the combustion process is regulated in the operating mode with auto-ignition by closed-loop control;

the combustion position is used as a reference variable; and the stepwise adaptation of the parameter includes modifying the reference variable.

20. The control unit according to claim 19, wherein the closed-loop control in the operating mode with auto-ignition includes a model-based predictive closed-loop control procedure, and a desired value of the combustion position is adapted in preparation before the changeover from the operating mode with auto-ignition to the operating mode without auto-ignition.

21. The control unit according to claim 19, wherein the closed-loop control in the operating mode with auto-ignition includes a model-based predictive closed-loop control procedure, and a desired value of the combustion position is adapted subsequently after the changeover from the operating mode without auto-ignition to the operating mode with auto-ignition.

22. A non-transitive computer-readable medium in which are stored instructions executable by a processor, the instructions which, when executed by the processor, cause the processor to perform a method for operating an internal combustion engine that is operable, at least in a part-load range, in an operating mode with auto-ignition, the method comprising:

adapting stepwise, at at least one of (a) an abrupt change in load and (b) a changeover between the operating mode with auto-ignition and an operating mode without auto-ignition, a parameter of a combustion process correlating with a combustion noise over a plurality of combustion cycles, from a first parameter value before at least one of (a) the abrupt change in load and (b) the changeover between operating modes to a second parameter value after at least one of (a) the abrupt change in load and (b) the changeover between operating modes, by influencing a combustion position of the combustion process; and shifting a quantity of fuel injected during the stepwise adapting from a main injection to a cooling injection, wherein the fuel injection is by direct injection into a combustion chamber of the internal combustion engine.

23. The non-transitive computer-readable medium according to claim 22, wherein the cooling injection takes place during a compression phase in the combustion process.

24. A control unit for operating an internal combustion engine operable, at least in a part-load range, in an operating mode with auto-ignition, the control unit comprising:

a computer processor configured to:

adapt stepwise, at at least one of (a) an abrupt change in load and (b) a changeover between the operating mode with auto-ignition and an operating mode without auto-ignition, a parameter of a combustion process correlating with a combustion noise over a plurality of combustion cycles, from a first parameter value before at least one of (a) the abrupt change in load and (b) the changeover between operating modes to a second parameter value after at least one of (a) the abrupt change in load and (b) the changeover between operating modes, by influencing a combustion position of the combustion process; and shift a quantity of fuel injected during the stepwise adapting from a main injection to a cooling injection, wherein the fuel injection is by direct injection into a combustion chamber of the internal combustion engine.

25. The control unit according to claim 24, wherein the cooling injection takes place during a compression phase in the combustion process.

* * * * *